(12) United States Patent
Kulkarni et al.

(10) Patent No.: US 7,721,282 B1
(45) Date of Patent: May 18, 2010

(54) BLOCK-LEVEL I/O SUBSYSTEM FOR DISTRIBUTED APPLICATION ENVIRONMENT MANAGEMENT

(75) Inventors: Pradip Kulkarni, Pune (IN); Mukul Kumar, Pune (IN); Adhir Potdar, Maharahstra (IN); Richard Au, Woodside, CA (US); James M. Mott, Austin, TX (US); Tung M. Nguyen, Cupertino, CA (US)

(73) Assignee: Panta Systems, Inc., Santa Clara, CA (US)

( * ) Notice: Subject to any disclaimer, the term of this patent is extended or adjusted under 35 U.S.C. 154(b) by 1084 days.

(21) Appl. No.: 11/395,816

(22) Filed: Mar. 30, 2006

Related U.S. Application Data

(63) Continuation-in-part of application No. 11/026,622, filed on Dec. 30, 2004.

(51) Int. Cl.
*G06F 9/445* (2006.01)
*G06F 9/44* (2006.01)

(52) U.S. Cl. .................. 717/176; 717/175; 709/203
(58) Field of Classification Search ......... 717/172–177, 717/149; 709/203–204
See application file for complete search history.

(56) References Cited

U.S. PATENT DOCUMENTS

| | | | | |
|---|---|---|---|---|
| 5,113,523 A * | 5/1992 | Colley et al. | .................. | 712/12 |
| 5,127,104 A * | 6/1992 | Dennis | ........................ | 712/201 |
| 5,764,902 A * | 6/1998 | Rothrock | .................... | 709/205 |
| 5,999,734 A * | 12/1999 | Willis et al. | ................. | 717/149 |
| 6,018,747 A * | 1/2000 | Burns et al. | ................. | 707/203 |
| 6,195,680 B1 * | 2/2001 | Goldszmidt et al. | ......... | 709/203 |
| 6,292,941 B1 * | 9/2001 | Jollands | ...................... | 717/176 |
| 6,502,238 B1 * | 12/2002 | Pavan et al. | .................. | 717/149 |
| 6,606,744 B1 * | 8/2003 | Mikurak | ..................... | 717/174 |
| 6,779,177 B1 * | 8/2004 | Bahrs et al. | ................. | 717/173 |
| 6,990,513 B2 * | 1/2006 | Belfiore et al. | ............. | 709/203 |
| 7,127,712 B1 * | 10/2006 | Noble et al. | ................. | 717/173 |
| 7,150,015 B2 * | 12/2006 | Pace et al. | .................. | 717/176 |
| 7,155,714 B2 * | 12/2006 | Makris et al. | ............... | 717/176 |
| 7,200,715 B2 * | 4/2007 | Kleiman et al. | ............. | 711/114 |
| 7,246,351 B2 * | 7/2007 | Bloch et al. | ................. | 717/175 |
| 7,263,551 B2 * | 8/2007 | Belfiore et al. | ............. | 709/219 |
| 7,331,047 B2 * | 2/2008 | Chu et al. | .................... | 717/178 |
| 7,454,462 B2 * | 11/2008 | Belfiore et al. | ............. | 709/203 |
| 7,467,293 B2 * | 12/2008 | Zhang et al. | ................... | 713/1 |
| 7,475,274 B2 * | 1/2009 | Davidson | ........................ | 714/4 |
| 7,496,739 B1 * | 2/2009 | Raghavan et al. | ............. | 713/1 |

OTHER PUBLICATIONS

Ohta et al, "Improving parallel write by node level request scheduling", IEEE, pp. 196-203, 2009.*
Li et al, "Design issue of a novel toolkit for parallel application performance monitoring and analysis in cluster and grid environments", IEEE ISPAN, pp. 1-6, 2005.*

(Continued)

*Primary Examiner*—Anil Khatri

(57) ABSTRACT

An embodiment of the present invention is directed to a system for distributing an application environment to a compute node. The system includes a first storage unit for storing blocks of a root image of the compute node and a second storage unit for storing a leaf image comprising new data blocks and changes to the blocks of the root image. The system further includes a union block device for interfacing between the compute node and the first and second storage units to distribute the application environment to the compute node. The union block device creates the application environment by merging the blocks of the root image stored on the first storage unit with the leaf image stored on the second storage unit.

30 Claims, 3 Drawing Sheets

OTHER PUBLICATIONS

Zhu et al, "Scheduling divisible loads in the dynamic heterogenous grid environment", ACM Infoscale, pp. 1-10, 2006.*

Chen et al, "Exploiting high level coherence information to optimize distributed shared state", ACM PPpPP, pp. 131-142, 2003.*

* cited by examiner

BLOCK-LEVEL I/O SUBSYSTEM FOR DISTRIBUTED APPLICATION ENVIRONMENT MANAGEMENT

CLAIM OF PRIORITY UNDER 35 U.S.C. §120

The present Application for Patent is a Continuation-in-Part of patent application Ser. No. 11/026,622 entitled "BRANCING STORE FILE SYSTEM" filed Dec. 30, 2004, pending, and assigned to the assignee hereof and hereby expressly incorporated by reference herein.

BACKGROUND

1. Field of the Invention

Embodiments of the present invention relate to the field of networked computing. Specifically, embodiments of the present invention relate to distributed application environment deployment in a multi-computer system.

2. Background

Over the years, as the interne has expanded and computers have multiplied, the need for clustered computing such as High Performance Computing (HPC) has increased. Clustered computing involves multiple compute nodes, usually a server grid, that work together to achieve a common task. For example, several (typically hundreds of) compute nodes may be clustered together to share the load of serving a high-traffic website. In large-scale systems such as this, a trend in software deployment is to centralize data management on a globally accessible file system with stateless computing nodes. A common example of this is Operating System (OS) software image management, where the compute nodes are activated with the distributed application environment by either diskless booting protocols or remote software installation to local storage. Under this architecture, a boot image is required for each compute node in the cluster. The boot image necessarily contains the kernel; it may additionally contain the application software that is intended to be run on the compute node.

The primary concern in clustered computing is low cluster bring-up time. The software that provides the boot images for the cluster typically stores a master boot image. It may then either pre-create clones of this master image for each such server, or it may create them "on the fly."

Creating a boot image on the fly involves copying the entire contents of the master image, which are typically in the range of 5-15 GB. Even with a significant amount of bandwidth by today's standards, this method will result in a large bring-up time.

Pre-creating a boot image for each server is advantageous from the point of view of cluster bring-up time. However, since one often does not know in advance how many servers will ever be booted, this scheme may result in wasted disk space.

Regardless of which of the preceding methods is used, both suffer from the same major problem—updating the boot image(s) for the cluster is cumbersome, as it means updating a number of copies of the boot image.

A Branching Store File System, as described in patent application Ser. No. 11/026,622 entitled "BRANCING STORE FILE SYSTEM" filed Dec. 30, 2004, pending, and assigned to the assignee hereof, was developed as a solution to the above problem. In a branching store file system, a read-only base image (or "root" image) of the application environment is created. The root image is accessible by all compute nodes in the cluster. Changes made by a compute node to the root image are stored in a "leaf" image unique to that compute node. A filter operates between the compute nodes and the file system(s), which merges the changes recorded on the leaf images with the root image and delivers the result to the appropriate compute node. From the point of view of the compute node, it is running its own unique and cohesive instance of the application environment. While this system allows for creation of boot images on the fly without severely diminishing bring-up time, a separate version of the system must be created for each unique operating system. Thus, migrating a computing cluster from one operating system to another is much more complicated than simply installing a new root image containing the new OS.

SUMMARY

An embodiment of the present invention is directed to a system for distributing an application environment to a compute node (e.g., a server or a thin-client workstation). The system includes a first storage unit for storing blocks of a root image (e.g., an operating system) of the compute node and a second storage unit for storing a leaf image comprising new data blocks and changes to the blocks of the root image. The system further includes a union block device for interfacing between the compute node and the first and second storage units to distribute the application environment to the compute node. The union block device creates the application environment by merging the blocks of the root image stored on the first storage unit with the leaf image stored on the second storage unit.

Another embodiment of the present invention is directed to a method for distributing an application environment to a compute node. The method includes storing blocks of a root image of the compute node on a first storage unit and storing a leaf image comprising new data blocks and changes to the blocks of the root image on a second storage unit. The method further includes merging the blocks of the root image stored on the first storage unit with the blocks of the leaf image stored on the second storage unit to create the application environment. The application environment is created by merging the blocks of the root image stored on the first storage unit with the blocks of the leaf image stored on the second storage unit. Lastly, the application environment is delivered to the computer node.

Thus, embodiments of the present invention provide an operating system-independent system and method for distributing an application environment to a compute node. By utilizing a root-leaf system of application environment storage, embodiments of the present invention allow creation of boot images on the fly without significantly diminishing bring-up time. This is due to the fact that creating a new boot image does not require copying the contents of the root image. Rather it involves registering a new UBD with the system, which occurs very quickly. Moreover, updating the boot image for the entire cluster simply involves updating the root image.

DETAILED DESCRIPTION

Figure 1:
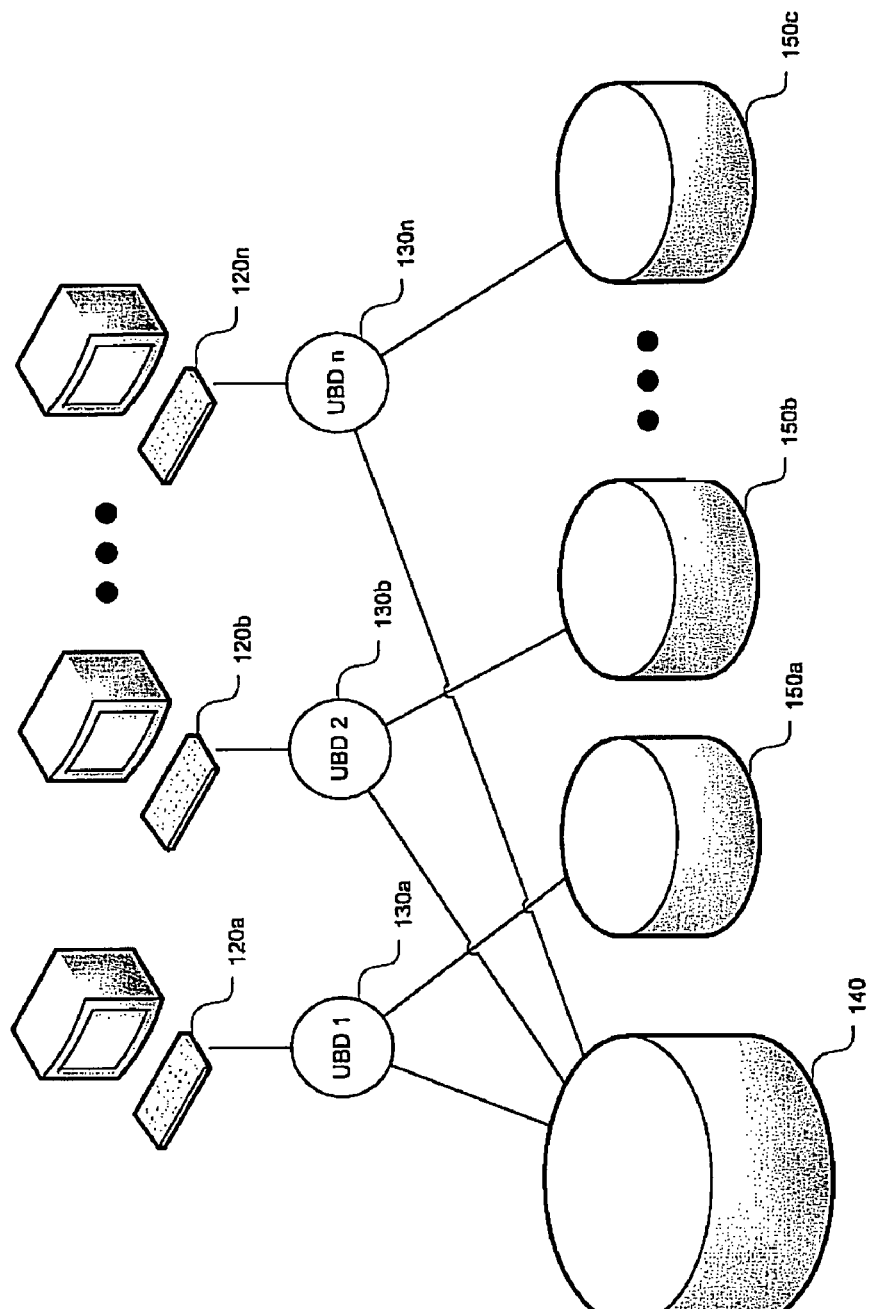
FIG. 1 is a diagram of a system for distributing an application environment, in accordance with an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Embodiments of the present invention provide methods and systems for distributing an application environment to one or more compute nodes. FIG. 1 is a diagram of a system 100 for distributing an application environment. In a preferred embodiment, system 100 is implemented in a multi-computer system, such as an HPC cluster. In one embodiment, the application environment includes an operating system. In other embodiments, the application environment may contain other applications. System 100 has a number of compute nodes 120a-n coupled to first storage unit and a corresponding second storage unit 150a-n though a corresponding union block device (UBD) 130a-n. To compute nodes 120a-n, it appears that they have access to their own version of a distributed application. However, a separate and complete boot image is not created and stored for each compute node 120a-n.

System 100 has a first storage unit 140 for storing blocks of a root image of an application environment. The root image contains data initially common to the compute nodes 120a-n. The root image is not changed by compute nodes 120a-n. For example, in one embodiment, compute nodes 120a-n have read-only access to the first storage unit.

Moreover, each compute node 120a-n has a corresponding second storage unit 150a-n for storing a leaf image. The first storage unit 140 and second storage units 150a-n may each be contained on separate physical storage devices, on separate logical spaces on the same storage device, or any combination thereof. The leaf image may contain blocks of new data, blocks of changed data, or other blocks of data unique to the individual compute node. The leaf image may also contain a block modification log. In other words, a leaf image will describe the changes made by the respective compute node 120a-n to its instance of the application environment. Thus, when a compute node (e.g., node 120a) makes changes involving the root image, modifications are made to that compute node's leaf image (e.g., leaf image stored on second storage device 150a). With respect to changes to the root image, only the specific blocks that are changed are stored in the leaf image. For example, a particular file on the root image may comprise twenty blocks of data (e.g., blocks 1-20). One compute node (e.g., compute node 120a) desires to make a change to this file which involves a modification of only a few specific blocks of the file (e.g., blocks 4-9). In this example, only the modified blocks (e.g., blocks 4-9) will be stored in the compute node's leaf image (e.g., leaf image stored on second storage device 150a) plus some small overhead.

A compute node 120a-n mounts its instantiation of the application environment via its respective UBD 130a-n. The UBDs 130a-n are effectively low-level drivers that operate as an interface between the first and second storage devices and the file system of each compute node 120a-n. The file system may reside on the server side of the system 100. The file system may also reside on each of the compute nodes 120a-n. Because UBDs 130a-n operate below the file system, they are concerned merely with the blocks of data themselves, rather than files they form. As a result, system 100 is completely file system, and thus operating system, independent.

UBDs 130a-n determine what leaf image (from the appropriate second storage unit 150) is needed for portions of the application environment that their respective compute nodes 120a-n have changed. UBDs 130a-n also locate the portions of the application environment that are not changed by their respective their respective compute nods 120a-n. These portions may reside in the root image. There may also be intermediate images (not depicted in FIG. 1) comprising versions of the root image from which a compute node's instance of the application environment is derived. Further, UBDs 130a-n create a new leaf image on a respective second storage unit 150a-n when their respective compute nodes 120a-n make changes to their instantiations of the application environment. In one embodiment, the UBSs 130a-n obtain the information necessary to create the application from a block modification log located in its respective leaf image.

UBDs 130a-n may also modify the leaf image in response to their respective compute node's access to its instance of the application environment. For example, upon receiving a write request from their respective compute nodes for a sector X, the UBDs 130a-n will create an appropriate persistent mapping for sector X and then write sector X onto their respective second storage units 150a-n, where sector X can then be modified. It will be appreciated that the data block being modified may already exist in the leaf image, in which case it does not need to be mapped and copied from the root image before modification.

By providing an application environment to multiple compute nodes via a branching store system, embodiments allow for a more streamlined update/patch procedure. In one embodiment, first storage device 140 may be refreshed with a new operating system patch, thereby automatically refreshing the image for all dependent compute nodes.

Application Groups

An embodiment of the present invention provides for application groups (AG). An AG is a way to provide a group of compute nodes their own instantiation of an application environment, while allowing versions of the application environment to be frozen from time to time. Thus, an archive of the application environment is created.

At creation time, an AG comprises the original root image. A number of leaf images are created to match the desired capacity demand of the AG. The leaf images can be created very quickly and require very little storage because the leaf images reflect only the changes to the root instance.

Figure 2:
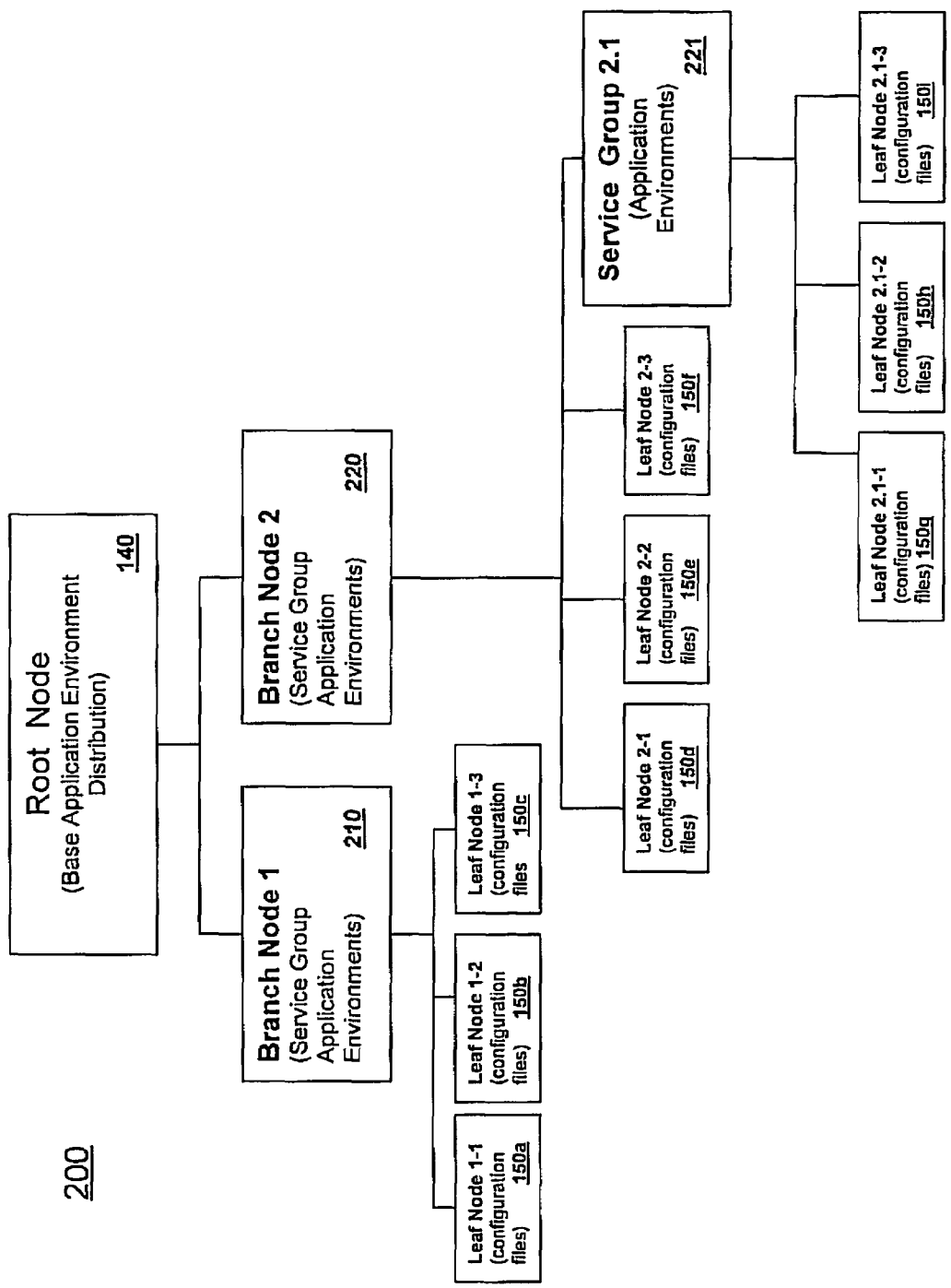
FIG. 2 is a tree structure that illustrates a branching system, in accordance with an embodiment of the present invention.

FIG. 2 is a tree structure 200 that illustrates a branching system, in accordance with an embodiment of the present invention. Some nodes are read-only, others are read-write-modify. A node may change from read-write-modify to read-only. For example, creating a new edition of the AG may be accomplished by freezing a current leaf image structure and creating a new set of leaf images therefrom. Referring now to FIG. 2, the root node 140 (also referred to herein as the root image) is the base application environment. As previously discussed, the root node 140 is not modified by compute nodes for which the application environment is distributed.

The first level of the exemplary tree structure 200 comprises first branch node 210 and second branch node 220. Branch node 210 has three leaf nodes 150a-c. The leaf nodes 150 may be for blocks from configuration files, for example. The compute nodes 150 can boot from the configuration files. The leaf nodes are also referred to herein as leaf images. In another embodiment, the leaf nodes 150 comprise block modification logs.

The branch node 220 also has three leaf nodes 150d-f, which are analogous to the leaf nodes 150a-c. However, branch node 220 also has a service group 221, which reflects a change to the application environment. The service group 221 has leaf nodes 150g-i.

Embodiments provide for additional advanced features. In one embodiment for example, a particular branch, rather than the entire tree structure back to the root, is refreshed with an update to the application environment contained thereon, thereby automatically refreshing its dependent compute nodes. In another embodiment, a leaf node or a branch node may be completely detached from the original structure to make a new and completely independent branch.

Figure 3:
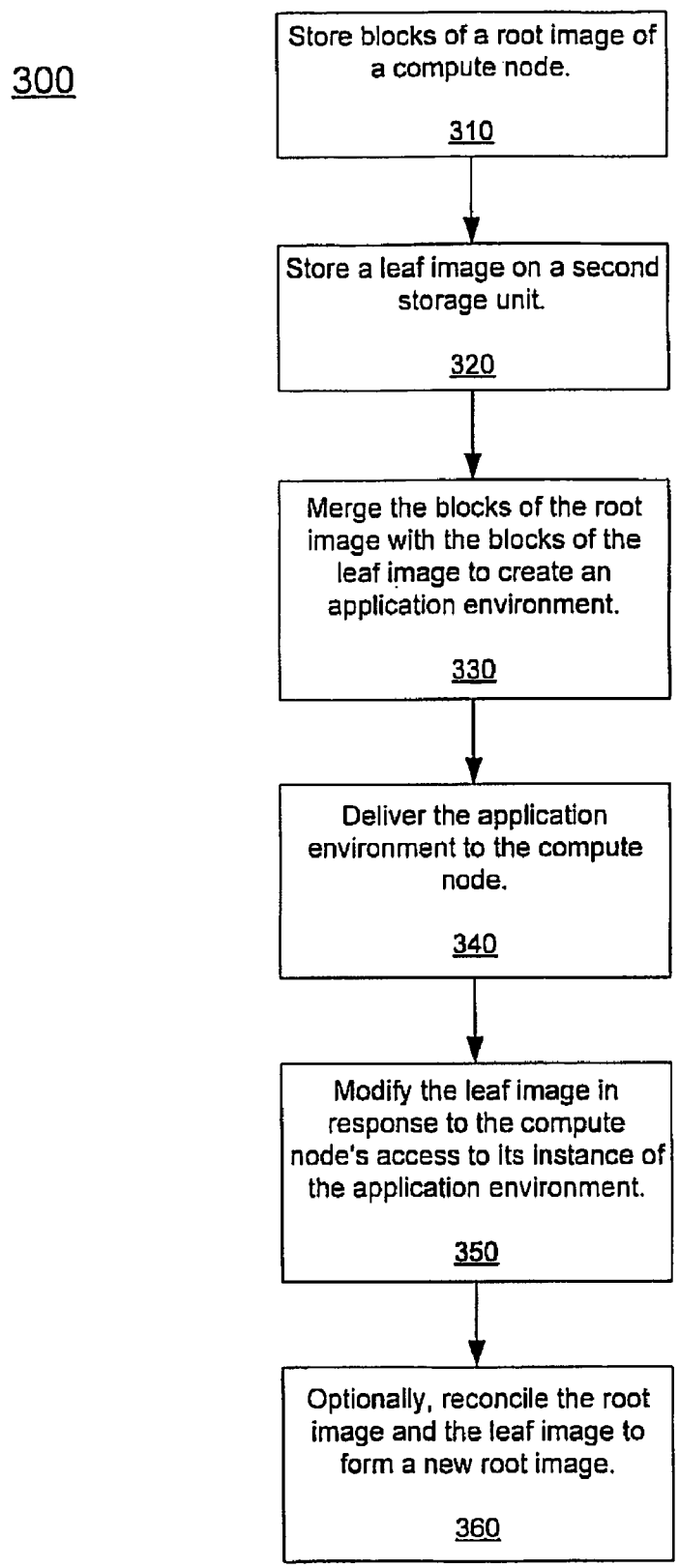
FIG. 3 is a flowchart illustrating a process 300 for distributing an application environment to a compute node, in accordance with an embodiment of the present invention.

FIG. 3 is a flowchart illustrating a process 300 for distributing an application environment to a compute node, in accordance with an embodiment of the present invention. Steps of process 300 may be stored as instructions on a computer readable medium and executed on a computer processor. Step 310 is storing blocks of a root image of the compute node on a first storage unit. By storing data at the block level, embodiments are able to operate beneath the file system and thus are designed to be file system and operating system independent.

Step 320 is storing a leaf image on a second storage unit. The leaf image includes, but is not limited to, new data blocks for the compute node and blocks of the root image that the compute node has changed. The leaf image includes a block modification log in one embodiment.

Step 330 is merging the blocks of the root image with the blocks of the leaf image to create the application environment. Once the application environment has been created, it will appear to the compute node as one cohesive image rather than a base image plus its additions, deletions, and modifications. To the compute node, it appears that it has access to its own unique version of an application. However, a separate and complete boot image is not actually stored for the compute node.

Step 340 is delivering the application environment to the compute node. Step 340 may comprise a low-level driver determining which data blocks are needed for the compute node's instance of the application environment and delivering the application environment to the compute via the compute node's file system.

Step 350 is modifying the leaf image in response to the compute node's access to its instance of the application environment. The modifying of the leaf image may include copying one or more data blocks from the root image to the leaf image, and modifying the data block in the leaf image. It will be appreciated that the data block being modified may already exist in the leaf image, in which case it does not need to be copied from the root image before modification.

Step 360 is reconciling the root image and the leaf image to form a new root image. This may be desirable if, for example, the leaf image has grown to exceed a particular disk quota. Furthermore, if there are multiple compute nodes that access the root image, each having their own respective leaf image, and there is substantial commonality between the leaf images, it may also be beneficial to reconcile the leaf images with the root image.

Thus, by operating at the block level, embodiments of the present invention provide a file system and operating system independent system and method for distributing an application environment to a compute node. By utilizing a branching store system of application environment distribution, embodiments of the present invention allow creation of boot images on the fly without significantly diminishing bring-up time. This is due to the fact that creating a new boot image does not require copying the contents of the root image, but rather it involves registering a new UBD with the system, which occurs very quickly. Moreover, updating the boot image for the entire cluster simply involves updating the root image.

Embodiments of the present invention also allow for scalability and redundancy. For example, a server containing the root image may only have the resources to supply the root image to 100 compute nodes. Thus, in order to implement a 200-compute node system, two servers, each containing a copy of the root image, are used. This scalability provided by embodiments also lends itself to dynamic scaling. In other words, the number of root images required for a specific configuration can change based on the I/O workload, and new root images can be created on the fly accordingly. Moreover, additional servers containing the root image may be added into the system to provide redundancy and increase reliability. As an added security measure, some of the root nodes may be located remotely from each other (e.g., half located in a main office and half in a satellite office). In addition, it is possible to copy the contents of one or more leaf nodes into a non-UBD (regular block device) copy (e.g., for use as an isolated backup).

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for distributing an application environment comprising:
   a compute node comprising a computer system;
   a first storage unit for storing blocks of a root image of the compute node, wherein the first storage unit comprises a first non-volatile memory, wherein the root image comprises a computer program, wherein the blocks comprise sections of data, and wherein a file of the root image comprises at least one block;
   a second storage unit for storing a leaf image, the leaf image comprising new data blocks and changes to the blocks of the root image, wherein the second storage unit comprises a second non-volatile memory; and
   a union block device for interfacing between the compute node and the first and second storage units to distribute the application environment to the compute node, wherein the union block device comprises a driver, wherein the union block device creates the application environment by merging the blocks of the root image stored on the first storage unit with the blocks of the leaf image stored on the second storage unit; the union block device comprises a low-level driver for interfacing between the first and second storage units and the file system of the compute node; and the union block device, upon receiving a write request from the compute node for a sector X, creates an appropriate persistent mapping for sector X.

2. The system as recited in claim 1 wherein the compute node comprises a server.

3. The system as recited in claim 1 wherein the compute node comprises a thin-client workstation.

4. The system as recited in claim 1 wherein the root image comprises an operating system.

5. The system as recited in claim 1 wherein the root image is concurrently accessible to a plurality of compute nodes.

6. The system as recited in claim 1 wherein the first storage unit is remotely located from the compute node.

7. The system as recited in claim 1 wherein the second storage unit is remotely located from the compute node.

8. The system as recited in claim 1 wherein the second storage unit contains a block modification log for the compute node.

9. The system as recited in claim 1 wherein the first storage unit in contained within a first partition on a hard disk and the second storage unit is contained within a second partition on the hard disk.

10. The system as recited in claim 1 wherein the union block device writes sector X on the second storage unit.

11. The system as recited in claim 1 wherein the system operates in a high performance computing cluster.

12. The system as recited in claim 1 wherein the system operates in a grid computing cluster.

13. The system as recited in claim 1 wherein the first storage unit is read only.

14. The system as recited in claim 1 further comprising an intermediate image between the root image and the leaf image, wherein the intermediate image comprises an application environment service group.

15. A method for distributing an application environment comprising:
    storing blocks of a root image of a compute node on a first storage unit, wherein the compute node comprises a computer system, and wherein the first storage unit comprises a first non-volatile memory, wherein the root image comprises a computer program, wherein the blocks comprise sections of data, and wherein a file of the root image comprises at least one block;
    storing a leaf image comprising new data blocks and changes to the blocks of the root image on a second storage unit, wherein the second storage unit comprises a second non-volatile memory;
    merging the blocks of the root image stored on the first storage unit with the blocks of the leaf image stored on the second storage unit to create the application environment; and
    delivering the application environment to the compute node; wherein the modifying comprises: upon receiving a write request from the compute node for a sector X, creating an appropriate persistent mapping for sector X; and writing sector X on the second storage unit.

16. The method as recited in claim 15 further comprising: modifying the leaf image in response to the compute node's access to the application environment.

17. The method as recited in claim 15 further comprising: reconciling the root image and the leaf image to form a new root image.

18. The method as recited in claim 15 wherein the compute node comprises a server.

19. The method as recited in claim 15 wherein the compute node comprises a thin-client workstation.

20. The method as recited in claim 15 wherein the root image comprises an operating system.

21. The method as recited in claim 15 wherein the root image is concurrently accessible to a plurality of compute nodes.

22. The method as recited in claim 15 wherein the first storage unit is remotely located from the compute node.

23. The method as recited in claim 15 wherein the second storage unit is remotely located from the compute node.

24. The method as recited in claim 15 wherein the second storage unit contains a block modification log for the compute node.

25. The method as recited in claim 15 wherein the first storage unit is contained within a first partition on a hard disk and the second storage unit is contained within a second partition on the hard disk.

26. The method as recited in claim 15 wherein merging occurs at an operational level between the first and second storage units and file system of the compute node.

27. The method as recited in claim 15 wherein the method operates in a high performance computing cluster.

28. The method as recited in claim 15 wherein the system operates in a grid computing cluster.

29. The method as recited in claim 15 wherein the first storage unit is read only.

30. The method as recited in claim 15 further comprising:
    creating an intermediate image on a third storage unit between the root image and the leaf image, wherein the intermediate image comprises an application environment service group.

* * * * *